US006952580B2

(12) United States Patent
Chang et al.

(10) Patent No.: US 6,952,580 B2
(45) Date of Patent: Oct. 4, 2005

(54) MULTIPLE LINK INTERNET PROTOCOL MOBILE COMMUNICATIONS SYSTEM AND METHOD THEREFOR

(75) Inventors: Donald C. D. Chang, Thousand Oaks, CA (US); Wah Lim, Santa Ana, CA (US); Ming Chang, Rancho Palos Veredes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 656 days.

(21) Appl. No.: 09/735,860

(22) Filed: Dec. 12, 2000

(65) Prior Publication Data

US 2002/0072360 A1 Jun. 13, 2002

(51) Int. Cl.[7] .............................. H04Q 7/20; H04H 1/00; H04B 7/185; H04J 3/24
(52) U.S. Cl. ...................... 455/427; 455/3.02; 455/428; 455/430; 370/316; 370/474
(58) Field of Search .............................. 455/12.1, 13.1, 455/427, 3.02, 3.05, 431; 370/319, 320, 321, 322, 474, 316, 310, 315, 394, 323, 324, 325, 326

(56) References Cited

U.S. PATENT DOCUMENTS

| | | | |
|---|---|---|---|
| 3,541,553 A | 11/1970 | Gubin | |
| 3,720,953 A | 3/1973 | Ajioka | |
| 4,085,368 A | 4/1978 | Yeh | |
| 4,500,883 A | 2/1985 | Gutleber | |
| 4,631,499 A | 12/1986 | Kasperkovitz | |
| 4,635,063 A | 1/1987 | Chang et al. | ................ 342/380 |
| 4,727,503 A | 2/1988 | McWhirter | |
| 4,799,065 A | 1/1989 | Thompson | |
| 4,812,788 A | 3/1989 | Wong et al. | |
| 4,819,227 A | 4/1989 | Rosen | ......................... 370/75 |
| 4,823,341 A | 4/1989 | Rosen | |
| 4,872,015 A | 10/1989 | Rosen | |
| 4,893,316 A | 1/1990 | Janc et al. | |
| 4,979,170 A | 12/1990 | Gilhousen et al. | ........ 370/104.1 |
| 5,017,927 A | 5/1991 | Agrawal et al. | ............ 342/371 |
| 5,077,562 A | 12/1991 | Chang et al. | ................ 342/368 |
| 5,081,464 A | 1/1992 | Renshaw | |
| 5,151,706 A | 9/1992 | Roederer et al. | |
| 5,233,626 A | 8/1993 | Ames | |
| 5,257,030 A | 10/1993 | Aoki et al. | |
| 5,278,863 A | 1/1994 | Briskman | |
| 5,319,673 A | 6/1994 | Briskman | |
| 5,327,455 A | 7/1994 | De Gaudenzi et al. | |
| 5,379,320 A | 1/1995 | Fernandes et al. | |
| 5,485,485 A | 1/1996 | Briskman et al. | |
| 5,550,809 A | 8/1996 | Bottomley et al. | ............. 357/1 |
| 5,552,798 A | 9/1996 | Dietrich et al. | |
| 5,568,484 A | 10/1996 | Margis | |

(Continued)

FOREIGN PATENT DOCUMENTS

EP 0 682 416 A2 11/1995
EP 0 860 952 A 8/1998

(Continued)

OTHER PUBLICATIONS

Colella N J et al., "The HALO Network™", IEEE Communications Magazine, IEEE Service Center, Piscataway, N.J. U.S., vol. 38, No. 6, Jun. 2000 (2000–06), pp. 142–148, XP 000932657, ISSN: 0163–6804.

(Continued)

*Primary Examiner*—William Trost
*Assistant Examiner*—Meless Zewdu
(74) *Attorney, Agent, or Firm*—Georgann S. Grunebach

(57) ABSTRACT

A communication system has a plurality of high altitude devices that are coupled to user terminals through a plurality of dynamic links. The terminal monitors and changes the multiple dynamic links as the position of the user terminal relative to the high altitude devices changes. The terminal transmits to and receives from the user terminals through the high altitude devices using a plurality of datagrams.

26 Claims, 5 Drawing Sheets

U.S. PATENT DOCUMENTS

| | | | |
|---|---|---|---|
| 5,589,834 A | * 12/1996 | Weinberg | 342/354 |
| 5,592,471 A | 1/1997 | Briskman | |
| 5,594,941 A | 1/1997 | Dent | 455/13.4 |
| 5,612,701 A | 3/1997 | Diekelman | 342/354 |
| 5,625,864 A | 4/1997 | Budow et al. | |
| 5,659,350 A | 8/1997 | Hendricks et al. | |
| 5,666,128 A | 9/1997 | Murray et al. | |
| 5,682,195 A | 10/1997 | Hendricks et al. | |
| 5,684,799 A | 11/1997 | Bigham et al. | |
| 5,689,568 A | 11/1997 | Laborde | |
| 5,715,516 A | 2/1998 | Howard | |
| 5,717,737 A | 2/1998 | Doviak et al. | 379/58 |
| 5,727,065 A | 3/1998 | Dillon | |
| 5,729,279 A | 3/1998 | Fuller | |
| 5,734,982 A | 3/1998 | Endo et al. | |
| 5,740,164 A | * 4/1998 | Liron | 370/316 |
| 5,751,971 A | 5/1998 | Dobbins et al. | |
| 5,754,139 A | 5/1998 | Turcotte et al. | |
| 5,764,187 A | 6/1998 | Rudish et al. | |
| 5,790,070 A | 8/1998 | Natarajan et al. | 342/354 |
| 5,790,541 A | 8/1998 | Patrick et al. | |
| 5,790,546 A | 8/1998 | Dobbins et al. | |
| 5,839,053 A | 11/1998 | Bosch et al. | |
| 5,852,721 A | * 12/1998 | Dillon et al. | 395/200.47 |
| 5,856,804 A | 1/1999 | Turcotte et al. | 342/371 |
| 5,862,480 A | 1/1999 | Wild | |
| 5,864,579 A | 1/1999 | Briskman | |
| 5,867,109 A | 2/1999 | Wiedeman | |
| 5,878,034 A | 3/1999 | Hershey et al. | |
| 5,884,142 A | 3/1999 | Wiedeman et al. | |
| 5,903,549 A | 5/1999 | Von der Embse et al. | 370/310 |
| 5,907,816 A | 5/1999 | Newman et al. | |
| 5,909,460 A | 6/1999 | Dent | 375/200 |
| 5,917,447 A | 6/1999 | Wang et al. | 342/383 |
| 5,918,157 A | 6/1999 | Wiedeman et al. | |
| 5,949,766 A | 9/1999 | Ibanez-Meier et al. | 370/316 |
| 5,956,619 A | 9/1999 | Gallagher et al. | |
| 5,973,647 A | 10/1999 | Barrett et al. | 343/713 |
| 5,974,317 A | 10/1999 | Djuknic et al. | 455/431 |
| 5,982,337 A | 11/1999 | Newman et al. | |
| 5,990,839 A | * 11/1999 | Schefte et al. | 343/702 |
| 5,990,928 A | 11/1999 | Sklar et al. | |
| 5,991,329 A | 11/1999 | Lomp | |
| 5,995,062 A | 11/1999 | Denney et al. | |
| 5,995,725 A | 11/1999 | Dillon | |
| 5,995,726 A | 11/1999 | Dillon | |
| 6,014,372 A | 1/2000 | Kent et al. | |
| 6,016,124 A | 1/2000 | Lo et al. | |
| 6,016,388 A | 1/2000 | Dillon | |
| 6,016,421 A | 1/2000 | Weiss | |
| 6,018,316 A | 1/2000 | Rudish et al. | |
| 6,020,845 A | 2/2000 | Weinberg et al. | |
| 6,034,634 A | 3/2000 | Karlsson et al. | |
| 6,061,562 A | 5/2000 | Martin et al. | |
| 6,084,541 A | 7/2000 | Sayegh | |
| 6,084,892 A | * 7/2000 | Benash et al. | 370/701 |
| 6,104,911 A | 8/2000 | Diekelman | |
| 6,105,060 A | 8/2000 | Rothblatt | |
| 6,111,542 A | 8/2000 | Day et al. | 342/359 |
| 6,118,824 A | 9/2000 | Smith et al. | |
| 6,118,998 A | 9/2000 | Wismer et al. | |
| 6,128,276 A | 10/2000 | Agee | |
| 6,138,012 A | 10/2000 | Krutz et al. | 455/427 |
| 6,147,658 A | 11/2000 | Higashi et al. | 343/853 |
| 6,151,308 A | 11/2000 | Ibanez-Meier et al. | 370/316 |
| 6,151,496 A | 11/2000 | Richards et al. | |
| 6,157,621 A | 12/2000 | Brown et al. | |
| 6,161,141 A | 12/2000 | Dillon | |
| 6,167,237 A | 12/2000 | Rapeli | |
| 6,167,286 A | 12/2000 | Ward et al. | |
| 6,173,178 B1 | 1/2001 | Hammill et al. | |
| 6,173,190 B1 | 1/2001 | Usui | |
| 6,198,920 B1 | 3/2001 | Doviak et al. | 455/426 |
| 6,201,797 B1 | 3/2001 | Leuca et al. | |
| 6,204,822 B1 | 3/2001 | Cardiasmenos et al. | |
| 6,204,823 B1 | 3/2001 | Spano et al. | 343/766 |
| 6,208,307 B1 | 3/2001 | Frisco et al. | |
| 6,208,858 B1 | 3/2001 | Antonio et al. | |
| 6,215,776 B1 | 4/2001 | Chao | |
| 6,259,415 B1 | 7/2001 | Kumpfbeck et al. | |
| 6,266,528 B1 | 7/2001 | Farzaneh | |
| 6,269,244 B1 | 7/2001 | Alperovich et al. | |
| 6,278,876 B1 | 8/2001 | Joshi et al. | |
| 6,295,440 B2 | 9/2001 | Chang et al. | |
| 6,301,231 B1 | 10/2001 | Hassan et al. | |
| 6,308,045 B1 | 10/2001 | Wright et al. | |
| 6,314,269 B1 | 11/2001 | Hart et al. | |
| 6,317,420 B1 | 11/2001 | Schiff | |
| 6,324,398 B1 | 11/2001 | Lanzerotti et al. | |
| 6,337,911 B1 | 1/2002 | Dillon | |
| 6,337,980 B1 | 1/2002 | Chang et al. | |
| 6,338,131 B1 | 1/2002 | Dillon | |
| 6,339,611 B1 | 1/2002 | Antonio et al. | |
| 6,339,707 B1 * | 1/2002 | Wainfan et al. | 455/427 |
| 6,353,643 B1 | 3/2002 | Park | |
| 6,359,868 B1 | 3/2002 | Chen et al. | |
| 6,366,256 B1 | 4/2002 | Ramanujam et al. | |
| 6,366,761 B1 | 4/2002 | Montpetit | |
| 6,380,893 B1 | 4/2002 | Chang et al. | |
| 6,385,434 B1 * | 5/2002 | Chuprun et al. | 455/11.2 |
| 6,385,647 B1 * | 5/2002 | Willis et al. | 709/217 |
| 6,388,615 B1 | 5/2002 | Chang et al. | |
| 6,388,634 B1 | 5/2002 | Ramanujam et al. | |
| 6,400,925 B1 | 6/2002 | Tirabassi et al. | |
| 6,408,180 B1 | 6/2002 | McKenna et al. | |
| 6,414,646 B2 | 7/2002 | Luh | |
| 6,424,646 B1 | 7/2002 | Gerszberg et al. | |
| 6,429,823 B1 | 8/2002 | Bains et al. | |
| 6,445,777 B1 | 9/2002 | Clark | |
| 6,484,213 B1 * | 11/2002 | Nouri | 709/249 |
| 6,507,314 B2 | 1/2003 | Chang et al. | |
| 6,507,739 B1 | 1/2003 | Gross et al. | |
| 6,510,172 B1 | 1/2003 | Miller | |
| 6,513,758 B1 | 2/2003 | Lloyd | |
| 6,529,706 B1 | 3/2003 | Mitchell | |
| 6,556,845 B1 | 4/2003 | Ide | |
| 6,559,797 B1 | 5/2003 | Chang | |
| 6,560,292 B1 | 5/2003 | Lundby | |
| 6,667,715 B1 | 12/2003 | Chang | |
| 6,704,543 B1 | 3/2004 | Sharon et al. | |
| 6,768,906 B2 | 7/2004 | Matthews et al. | |
| 2001/0000167 A1 | 4/2001 | Chang et al. | |
| 2001/0004604 A1 | 6/2001 | Toshinitsu | |
| 2001/0048389 A1 | 12/2001 | Nakagawa | |
| 2002/0006795 A1 | 1/2002 | Norin | |
| 2002/0050946 A1 | 5/2002 | Chang et al. | |
| 2002/0053987 A1 | 5/2002 | Chang et al. | |
| 2002/0072332 A1 | 6/2002 | Chang et al. | |
| 2002/0072361 A1 | 6/2002 | Knoblach et al. | |
| 2002/0072374 A1 | 6/2002 | Chang et al. | |
| 2002/0073437 A1 | 6/2002 | Chang et al. | |
| 2002/0080732 A1 | 6/2002 | Feria et al. | |
| 2002/0081969 A1 | 6/2002 | Chang et al. | |
| 2002/0106041 A1 | 8/2002 | Chang et al. | |
| 2002/0118654 A1 | 8/2002 | Chang et al. | |
| 2002/0126042 A1 | 9/2002 | Chang et al. | |
| 2002/0128044 A1 | 9/2002 | Chang | |
| 2002/0128045 A1 | 9/2002 | Chang et al. | |
| 2002/0132643 A1 | 9/2002 | Chang | |

FOREIGN PATENT DOCUMENTS

| | | |
|---|---|---|
| EP | 0 961 416 A1 | 12/1999 |
| EP | 1 026 778 | 1/2000 |
| EP | 1 037 403 A2 | 9/2000 |
| EP | 1 122 813 A2 | 8/2001 |
| EP | 1 139 583 A2 | 10/2001 |
| EP | 1 148 662 A2 | 10/2001 |
| EP | 1 152 552 A2 | 11/2001 |
| EP | 1 158 698 A2 | 11/2001 |
| EP | 1 161 001 A2 | 12/2001 |
| GB | 2 349 045 | 10/2000 |
| JP | 10-209939 | 8/1998 |
| JP | 11-8579 | 1/1999 |
| JP | 2001345747 A | 12/2001 |
| WO | WO 90/13186 | 11/1990 |
| WO | WO 97/07609 A | 2/1997 |
| WO | WO 99/16201 | 4/1999 |
| WO | WO 01/91310 A3 | 11/2001 |
| WO | WO 01/93458 A2 | 12/2001 |
| WO | WO 01/94969 A3 | 12/2001 |
| WO | WO 01/95522 A1 | 12/2001 |

OTHER PUBLICATIONS

Suzuki, R. et al, :Mobile TDM/TDMA System With Active Array Antenna, Global Telecommunications Conference, 1991; Globecom '91, vol. 3, Dec. 2–5, 1991, pp. 1569–1573.

Chan, K. K., et al, "A Circulary Polarized Waveguide Array for Leo Satellite Communications", Antennas and Propagation Society, 1999, IEEE International Symposium, vo. 1, Jul. 11–16, 1999, pp. 154–157.

Oodo, M., et al, "Onboard DBF Antenna for Stratospheric Platform", 2000 IEEE International Conference on Phased Array Systems and Technology, Proceedings, May 21–25, 2000, pp. 125–128.

Yokosuka Research Park, "The First Stratospheric Platform Systems Workshop", May 12–13, 1999, pp. 1–216.

Chiba, Isamu et. al, "Digital Beam Forming (DBF) Antenna System for Mobile Communications", IEEE AES Systems Magazine, Sep. 1997, pp. 31–41.

Miura, Ryu et. al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

Colella, Nicholas J. et al., "High Speed Internet Access via Stratospheric HALO Aircraft", INET 99 Proceedings, Internet Society, Technology, Wireless, 13 pages, Jun. 8, 1999.

Casewell I.E. , "The provision of GSM cellular radio environments within passenger aircraft operating over Europe", Racal Res. Ltd., Walton–on–Thames, Mobile Radio and Personal Communications, 1989, Fifth International Conference, Dec. 11–Dec. 14, 1989, pp. 172–176.

U.S. Appl. No. 09/611,753, filed Jul. 7, 2000, Chang et al.
U.S. Appl. No. 09/587,960, filed Jun. 6, 2000, Yung et al.
U.S. Appl. No. 09/587,759, filed Jun. 6, 2000, Yung et al.
U.S. Appl. No. 09/576,648, filed May 22, 2000, Yung et al.
U.S. Appl. No. 09/566,759, filed May 5, 2000, Novak et al.
U.S. Appl. No. 09/644,225, filed Aug. 21, 2000, Hagen et al.
U.S. Appl. No. 09/655,498, filed Sep. 5, 2000, Chang et al.
U.S. Appl. No. 09/584,012, filed May 30, 2000, Chang.
U.S. Appl. No. 09/550,505, filed Apr. 17, 2000, Chang.

* cited by examiner

MULTIPLE LINK INTERNET PROTOCOL MOBILE COMMUNICATIONS SYSTEM AND METHOD THEREFOR

TECHNICAL FIELD

The present invention relates generally to a mobile communication system and, more particularly, to a communication system that uses multiple links for effectively communicating with a mobile user.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. In particular, data transfer may include coupling to the Internet to take advantage of the various resources provided therethrough.

One problem associated with providing mobile communications is maintaining a communications link between the moving mobile terminal and the high altitude device associated therewith. Many types of high altitude devices are used in mobile communication systems including stratospheric platforms, middle earth orbit satellites and low earth orbit satellites. The satellites move relative to the earth and the mobile terminals also move relative to the earth. Prior known systems typically do not provide reliable links particularly in high data intensive applications.

For example, in such systems a single dynamic link may degrade over time due to the relative movement of the mobile terminal relative to the high altitude communication device. As the devices move, the quality of the link drops. Therefore, the total throughput of the system is inhibited.

It would therefore be desirable to provide a reliable mobile communication system capable of handling high data rates and doing so without sacrificing connectivity or data rate.

SUMMARY OF THE INVENTION

It is therefore an object of the invention to provide a mobile communication system that allows high data rate connectivity to the Internet.

In one aspect of the invention, a communication system has a plurality of high altitude devices that are coupled to user terminals through a plurality of dynamic links. The terminal monitors and changes the multiple dynamic links as the position of the user terminal relative to the high altitude devices changes. The gateway terminal transmits to and receives from the user terminals through the high altitude devices using a plurality of datagrams.

In a further aspect of the invention, a method for operating a communication system comprises the steps of:

forming a plurality of multiple communication links directed to a plurality of high altitude communication devices;

dividing a communication into a plurality of datagrams;

routing the plurality of datagrams through the plurality of multiple communication links;

directing the datagrams from the high altitude communication device to a gateway station; and reassembling the datagrams into the communication.

One advantage of the invention is that a stratospheric platform may be used to provide the high altitude communication function. This allows the communication system according to the present invention to be rapidly deployed.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
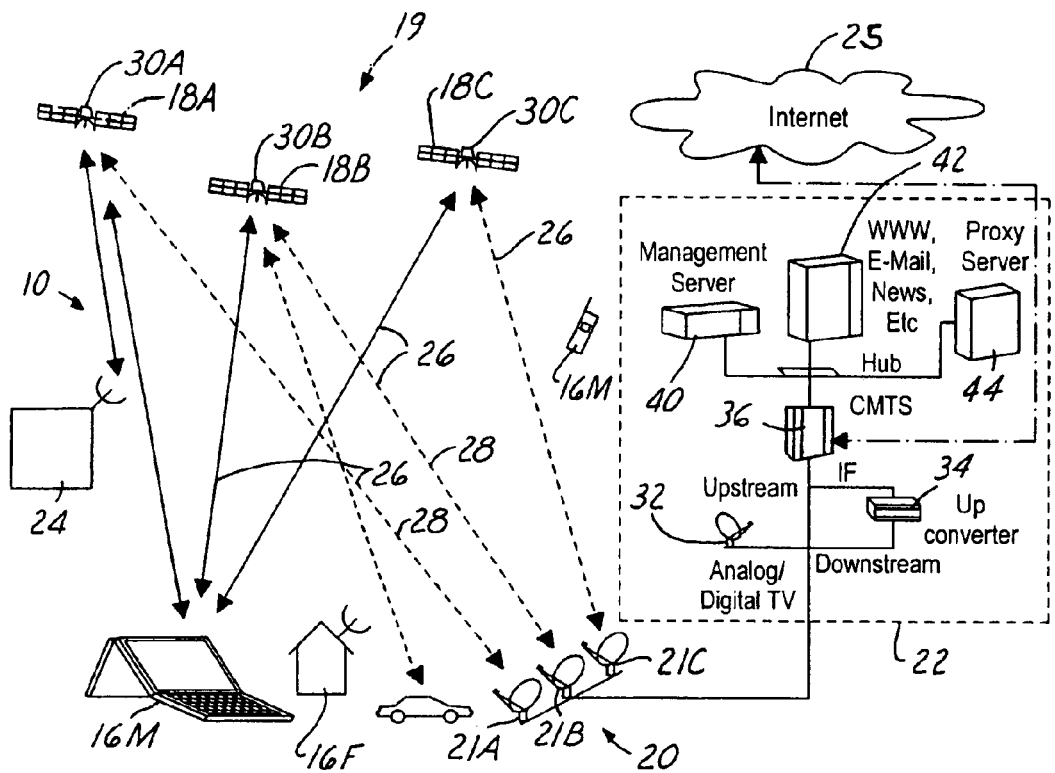
FIG. 1 is a system diagram of a communication system according to the present invention.

In the following description, the same reference numerals are used to identify the same components in the various views. Those skilled in the art will recognize that various other embodiments, structural changes and changes in measures may be made without departing from the scope of the invention. The following description is described with respect to mobile terminals. Although the advantages are evident in mobile applications, the present invention could be used for fixed terminals.

Referring now to FIG. 1, a communications system 10 is used to couple plurality of user terminals 16M and 16F with a plurality of high altitude communications devices 18A, 18B and 18C and will be collectively be referred to as high altitude communication device 18. A plurality of user terminals 16M and 16F are used to illustrate mobile users and fixed users, respectively. Mobile users 16M may comprise but are not limited to automotive applications and other types of transportation systems such airplanes, trains, ships, personal digital assistant applications, portable computers and cellular phone applications. Fixed user terminals 16F may, for example, comprise business-based or consumer-based communication systems. Each user terminal 16F and 16M may receive a signal with the predetermined signal strength from a spot beam pattern that is radiated from each high altitude communication device 18. The present invention is particularly advantageous for use with mobile terminals 16M.

Communication system 10 further includes a gateway station 20 that is coupled to terrestrial networks 22. Communication system may also include a platform operations center 24. Both gateway station 20 and platform operations center 24 are in communication with stratospheric platform 18. Gateway station 20 provides a link between user terminals 16F, 16M and terrestrial networks 22 through stratospheric platforms 18. Platform operation center 24 provides command and control functions to communications platform 18. Although illustrated as two separate units, gateway station 20 and platform operation center 24 may be combined into the same physical location.

The communication signals between stratospheric platform 18 and user terminals 16M and 16F may be referred to as user links 26. User links 26 represent the transmit and receive beams from both categories of user terminals 16F, 16M and high altitude communications platform 18. A feeder link 28 is defined between high altitude communications platform 18 and gateway station 20.

High altitude communications platform 18 may be a stratosphere-based platform. Stratospheric based platforms may be implemented in many forms including an unmanned vehicle that can fly for several months at an altitude of over 60,000 feet above the earth. The stratospheric platform is operated through the platform operations center 24 to fly in a small radius flight path over a given spot on the earth. As far as users are concerned, the platform is geo-stationary. In addition to a plane-like platform, the stratospheric platform may comprise a balloon or blimp-like platforms. Communications platforms 18 may also be formed from geostationary (GEO), middle earth orbit (MEO) or low earth orbit (LEO) satellites. It is more likely that the system be implemented in LEO or MEO satellites, if satellites are used.

Communications platforms 18 are used as a communication node for gateway station 20 and user terminals 16F and 16M. Gateway station 20 has antennas 21A, 21B and 21C corresponding to a respective one of the high altitude communications platforms 18A, 18B and 18C. As will be described below, the pointing from mobile terminals 16M may be performed electronically. Although only one gateway station 20 is illustrated in the figure, chose skilled in the arc would recognize that various numbers of interconnected gateway stations 20 may be employed. As would be further described below, gateway station 20 with high gain antenna 21A, 21B 21C that has a narrow beam width. The antenna may need a tracking mechanism with tracking speed adequate enough to maintain a communication link with the platform 18 throughout the flight path. Gateway station 20 may be coupled to a gateway control circuit 22 which is ultimately connected to the Internet 25, or a corporate intranet.

Each high altitude communication platform 18 has a respective payload 30A, 30B and 30C that links with user terminal 16M, 16F through the use of a phased array antenna and gateway station 20 with a feeder link antenna (preferably a parabolic dish) described below. In the present example, the payload 30 is used to generate a plurality of user beams configured according to the signals as determined in the gateway station 20.

Gateway control circuit 22 may have various circuitry coupled thereto. For example, analog or digital TV 32, an up converter 34, and a cable modem terminal shelf (CMTS) 36. CMTS may be used to couple to Internet 24. CMTS 36 may be coupled to a hub 38 that has various resources coupled thereto. The hub 38 may, for example, have a management server 40, a world wide web, e-mail or news server 42 or a proxy server 44.

Figure 2:
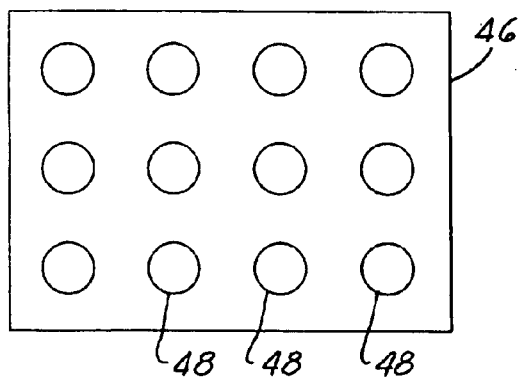
FIG. 2 is a suitable low profile antenna array for use in the present invention.
Figure 3:
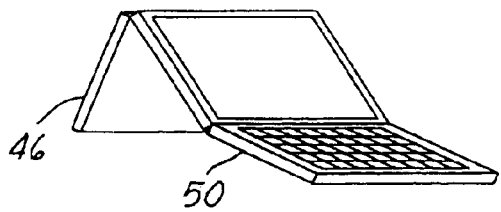
FIG. 3 is a perspective view of a portable personal computer having an antenna array of FIG. 2.

Referring now to FIG. 2, an antenna 46 for use with the present invention is illustrated. Antenna 46 is preferably a patch antenna having a plurality of elements 48. The patch antenna is capable of simultaneously generating multiple links to the various high altitude communication devices 18. Various size and shape antennas are contemplated depending on the specific application. Such an antenna provides the advantages of being low cost, low profile, and high in performance which will encourage adoption in the consumer market. As illustrated in FIG. 3, antenna may, for example, be approximately 12"×18" with 12 elements 48. Each element may, for example, be 0.3 wavelengths in diameter. Each of the elements may, for example, be placed 0.45 wavelengths apart in the rectangular lattice. Therefore, the total aperture is a square of about 2 wavelengths×1.5 wavelengths. The expected peak gain in such a system is 14 dB at the boresite, and 12 dB at 60 degrees away from the boresite. The beam widths for the boresite elliptical beam may be approximately 30 degrees and approximately 35 degrees, respectively. The elements are dielectrically loaded and properly matched to have an element beam width of about 150 degrees. Overall aperture efficiency is over 80 percent due to the densely populated elements. It is envisioned that in a consumer application, a motherboard having a number of identical elements may be used. Antenna 46 converts the received microwave power into a digital stream in the receiving direction and converts the digital stream into radiated power in the transmitting direction. The phasing of the elements is implemented by digital multiplication on the motherboard as will be further described below. Performance-wise, a maximum bandwidth for a user signal is assumed to be about 5 MHz. A sampling rate such as approximately 100 Msps with an approximately 4 bit resolution may be used. An aperture time of the analog-to-digital converter may be less than one-eighth of the period of the carrier frequency. At a 2 GHz carrier frequency, for example, an aperture time of 50 picoseconds is adequate.

Such a design is preferably scalable to allow other elements 48 to be plugged into the array. Such flexibility allows higher gain for the antenna 46, if needed.

When forming multiple beams or links, the sampled signals at element level will be "reused" for the second, third and rest of the beams. As will be further described below, different sets of digital beam formers and frequency and time circuitry are used. Therefore, the incremental cost and processing load of additional beams is low. When first activated, antenna 46 during an acquisition phase all beams will be used simultaneously over the entire field of view of a fan-beam. Thus, the search volume will be reduced to a one-dimensional search in time sequence. If some knowledge is present in the system, only a few beams may be needed to establish the link acquisition.

When a user link is established, the beam generated by a user terminal may be electronically tracked to match that of the movement of platforms. Signal strengths from adjacent beams are monitored and compared to the main beam. The beam with the strongest signal will be identified and locked as the main beam. As the platform and/or user moves, the main beam may be switched. The terminal will always choose the beam with the strongest (desired) received signal as the main beam.

Referring now to FIG. 3, a portable personal computer 50 having an antenna 46 formed according to FIG. 2 is illustrated. Because of the relatively small, thin profile of the antenna, incorporation into a portable personal computer is relatively easy.

Figure 4:
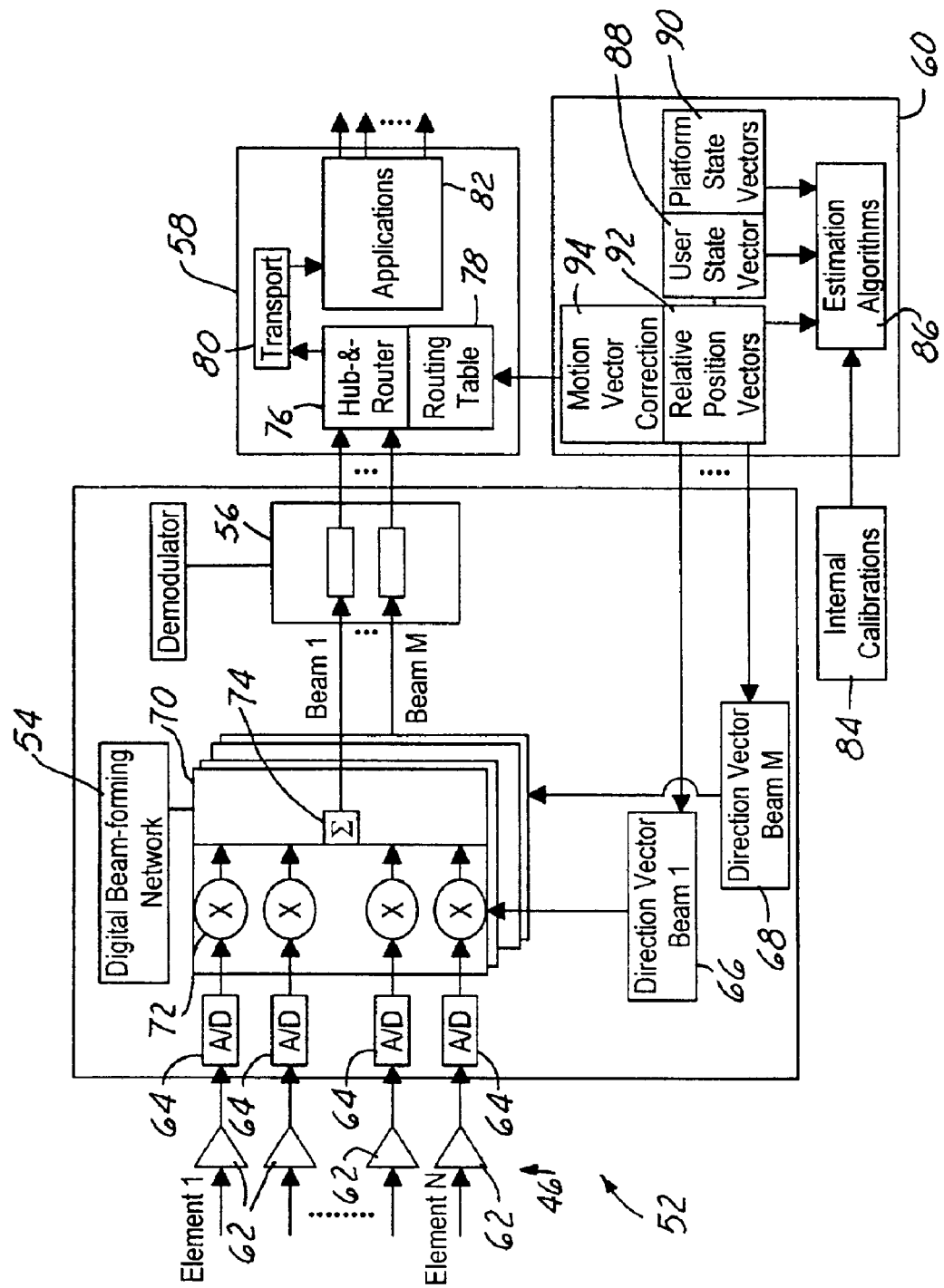
FIG. 4 is a block diagrammatic view of a mobile satellite terminal in receive mode.

Referring now to FIG. 4, a user terminal 52 is illustrated in block diagrammatic form. User terminal 52 generally has a digital beam forming network 54 coupled to a demodulator 56. Demodulator 56 is coupled to a hub and router circuit 58. A direction control circuit 60 is coupled to hub and router circuit 58 and to digital beam forming circuit 54. The general operation of user terminal 52 is that multiple beams are generated at digital beam forming circuit 54. Direction control circuit 60 generally tracks the direction of the movement of the user terminal 52 and the high altitude devices and provides this information to hub and router circuit 58 and the digital beam forming circuit 54.

Digital beam forming circuit 54 has a plurality of elements 62 that correspond to the elements 48 shown in FIG. 2. Various groupings of elements 62 are used to generate the simultaneous multiple links of the present invention. Each element 62 is coupled to a corresponding analog-to-digital converter 64 through a band pass filter (BPF) 63. The digital outputs from all analog-to-digital converters 64 are weighted and summed, and then grouped together to form beams beam 1 through beam m as illustrated. The beams are formed by numerical multiplications using the direction vector beam 1 illustrated as reference numeral 66 and through direction vector beam m through forming circuit 70. Forming circuit 70 may have a plurality of multiplication blocks 72 and summing blocks 74 implemented either physically or in software to form the various beams. Functions of beam forming, frequency tuning and time synchronization are interlaced to minimize the over-processing mode, instead of sequentially. This approach eliminates conventional phase shifters and minimizes the required RF components making the implementation suitable for consumer applications. Digital beam forming circuit 54 will typically be used to generate multiple simultaneous links with high altitude device 18. It is envisioned that about no more than 10 multiple links would be established at any time.

The links or beams are coupled to a demodulator 56 which demodulates signals and recovers the information in various packages or datagrams. The recovered information is provided to routing circuit 58 which has a hub and router circuit 76 coupled to a routing table 78 which is updated from direction control circuit 60. Hub and router circuit 76 is coupled to a transport circuit 80 which in turn is coupled to an applications circuit 82. As will be further described below, each user link has only a portion of the total signal to be received. These signal portions are referred to as datagrams in the present invention. Hub and router 76 receives various datagrams from the different user links 26 and reassembles them. The various datagrams may not arrive in a sequential order. Thus, hub and router 76 assembles them and may have to shuffle the datagram packets to provide the desired reassembled signal. Once receiving an entire communication segment, transport circuit 80 couples the signal to various applications within the device such as a web browser or other programs. It should be noted that the fragments must all be reassembled in order to provide a coherent message. If any of the fragments are lost, the transport layer will order a retransmit of the missing portion of the datagram. The terminal may start a reassembly timer when it receives an initial fragment. If the timer expires before all the fragments arrive, the user terminal 52 may discard the surviving pieces without processing the datagram. A request for resending the signal may be initiated.

Direction control circuit 60 is coupled to external calibrations 84 which may be input to the system. External calibrations may include information about the various satellites in the system and the relative positions thereof. Estimation algorithms 86 are coupled to external calibrations 84. Estimation algorithms 86 determine a user state vector 88 and a platform state vector 90. The user state vector 88 and platform state vectors 90 determined the absolute position of each of the high altitude devices and of the user. The user state vector 88 and the platform state vectors 90 are used to generate relative position vectors 92 between user state vector 88 and platform state vectors 90. The relative position vectors 92 are used to generate motion vector correction factor 94 which in turn are provided to routing table 78 in hub and router circuit 58 so the directions of the links (or direction of array beams) can be changed.

Figure 5:
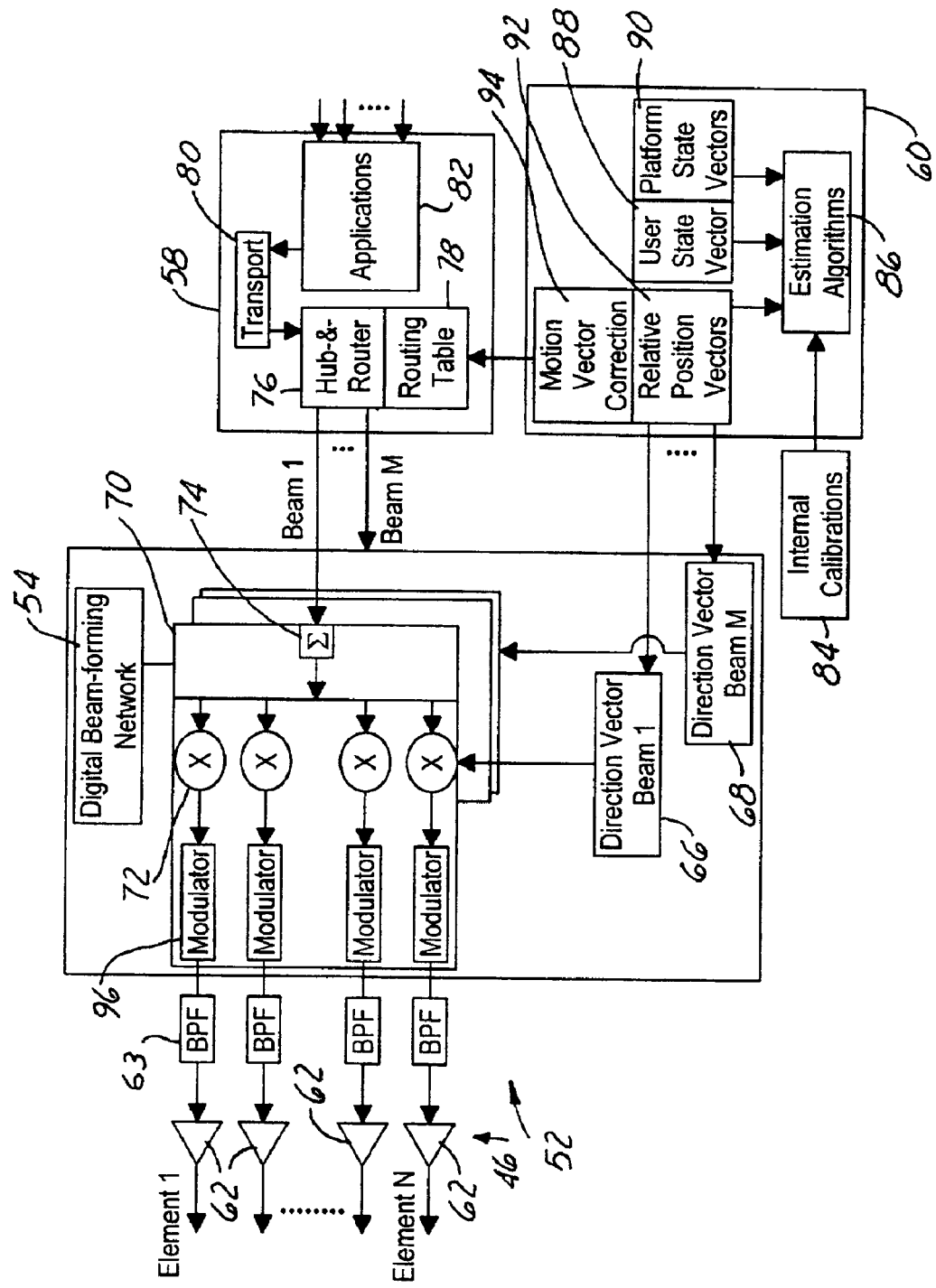
FIG. 5 is a block diagrammatic view of a terminal in transmit mode.

Referring now to FIG. 5, a transmit circuit similar to that shown in FIG. 4 is illustrated with the same reference numerals illustrated above. It is a generic diagram in which only one modulation is associated with an array beam. It is possible to have multiple links through different beams and different modulation. In the digital beam forming for a given beam, the signal is divided, phase-weighted, and individually modulated before summing circuits for all the elements. The modulation is performed in the microwave carrier frequency by a modulator 96 in every element for each beam. Every element will group all the modulated signals from various beams together before amplification. The amplified element signals are radiated to far field. As a result of the proper phasing in digital beam forming, signals designated for a beam direction radiated from various elements will be coherently summed together in the far field at the particular direction. Similarly signals for the second beam direction will also be spatially combined coherently in the corresponding directions. The modulations for the first and second beams may not be the same.

Figure 6:
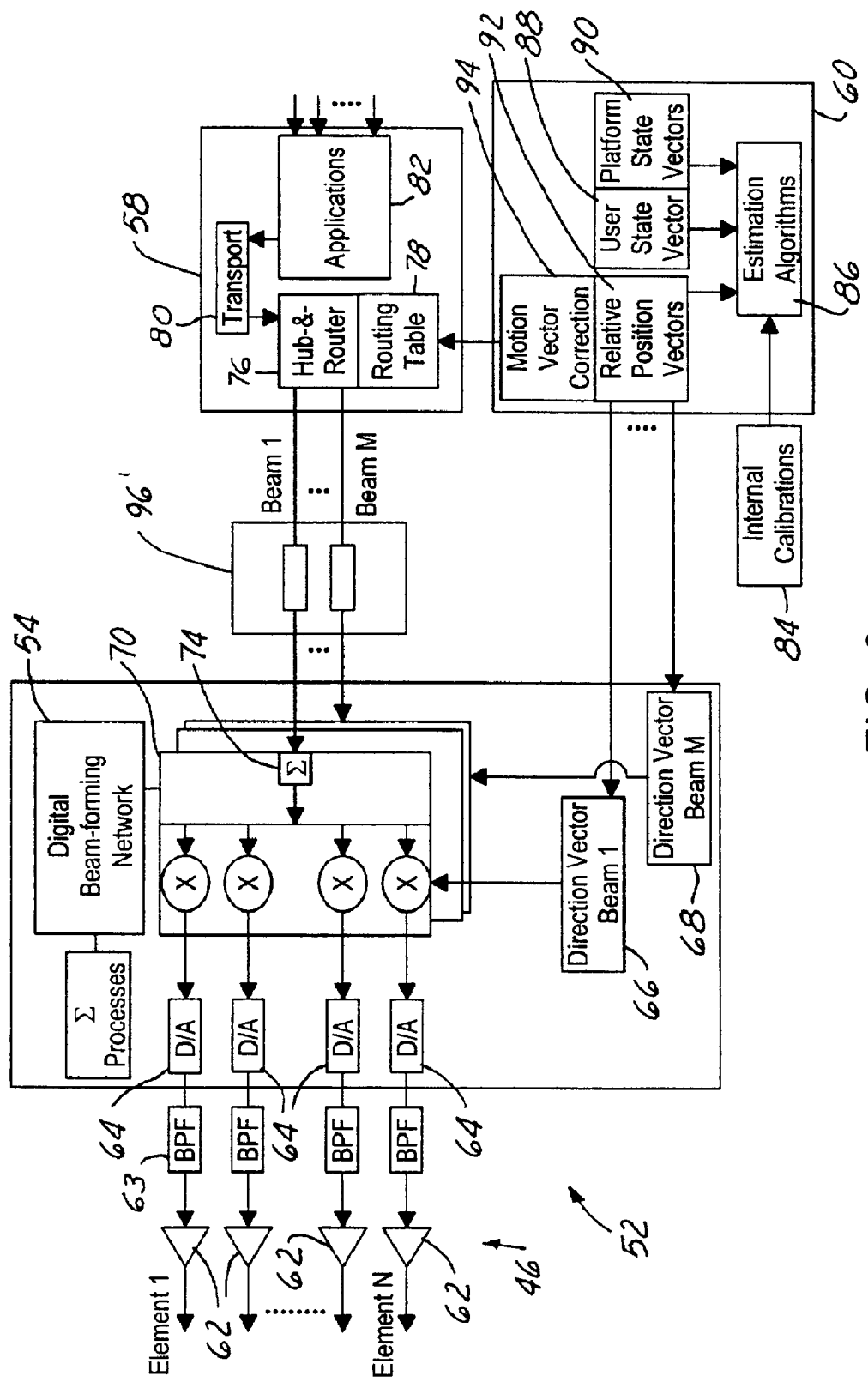
FIG. 6 is an alternative block diagrammatic view of a terminal in transmit mode.

The difference between the transmit architectures in FIG. 5 and FIG. 6 is how the modulation is performed. In FIG. 5, the modulation processing is performed in RF frequency band while that in FIG. 6 the transmit signals are modulated in base-band. In FIG. 6, a circuit similar to that of FIG. 4 is illustrated. In this figure, the modulator 96' has been moved in front of the digital beam forming circuit 54, connecting hub and router circuit 58 and digital beam forming circuit 54. This configuration is believed to be advantageous for a multiple beam configuration.

In operation, the present invention preferably uses TCP/IP protocol. The TCP/IP protocol allows the user terminal to generate both multiple and receiving and transmitting beams to take advantage of the different high altitude communication devices in view to transmit and receive various datagrams, which are portions of complete messages, to and from the gateway terminal. The gateway terminal also receives the datagrams and reassembles them. The present invention takes advantage of the existing TCP/IP protocol and applies it to multi-beam mobile applications. This combination allows mobile terminals to operate in packet-by-packet modes efficiently rather than circuit designated modes, taking advantage of high dynamics from multiple beams and providing various bundled multimedia mobile services to various content providers from TCP/IP protocol.

Figure 8:
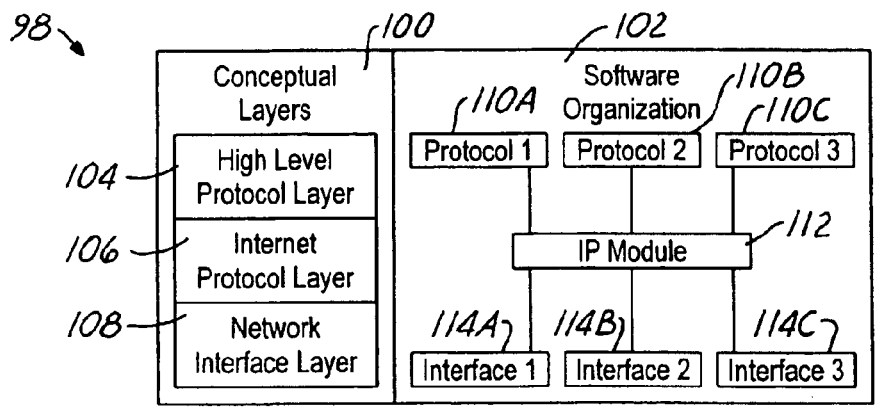
FIG. 8 is an organizational view of a software implementation of the present invention.

Referring now to FIG. 8, the TCP/IP protocol is constructed by layers of modular protocol software. Each layer of the software handles a portion of the problem. For example, one layer of the receive terminal must decide whether to keep the message or forward it to another machine. Another layer must decide which application program should receive the message. Table 98 shows a software organization 102 in various conceptual layers, similar to the Open System Interconnection (OSI) layers. Conceptual layers have a network interface layer 108 (or physical and link layers in the OSI layer structure), an Internet protocol layer 106 (or a network layer), and a high level protocol layer 104. In the high level layer 104 we have grouped all other OSI layers together; from transport, session, presentation and applications. Various protocols 110A, 110B, and 110C are illustrated coupled to an IP module 112. The IP module 112 is coupled to an interface 114A, 114B, and 114C. The protocols correspond to high level protocol layer 104, IP module 112 corresponds to Internet protocol layer 106, and interfaces 114A, B and C correspond to network interface layer 108. Thus as shown, the IP software may communicate with multiple high level protocol modules with multiple network interfaces. From table 98 it is clear that IP protocol is the protocol in the network layer. The IP protocol software must interface with multiple protocols below IP and the IP protocol software must also work with multiple protocols above IP. Preferably, each interface below IP is a wireless link using open communication architecture to set up the terminal software modules cost effectively.

In a receive mode, an aggregated data stream intended for a user terminal is grouped into datagrams which are the basic transfer units in the TCP/IP protocol. A datagram is divided into a header and a data area. The IP protocol specifies the header format including the source and destination IP address. The IP protocol does not specify the format of the data area. Arbitrary data may be transmitted in the data area. The length of the datagram is given by the total field length which is specified as 16 bits long. Therefore, the maximum of the datagram is 64 kilobytes.

The TCP/IP software chooses a convenient initial datagram size for the communication and arranges a way to divide large datagrams into smaller pieces when the datagram needs to traverse a network that has a small maximum transfer unit (MTU). The small pieces or communication portions into which a datagram is divided are called fragments, and the process of dividing a datagram is known is fragmentation. Fragmentation usually occurs at a router somewhere along the path between the datagram source and its ultimate destination. The router receives a datagram from a network with a large MTU and must send it over a network for which the MTU is smaller than the datagram size. Once the datagram has been fragmented, the fragments travel as separate datagrams all the way to the ultimate destination where they are reassembled. In the present case, each of the datagrams may be sent to the high altitude device 18 through multiple links from user terminal 52. The datagrams are then sent through multiple links from the high altitude devices 18 to a gateway station where they are reassembled. The datagrams are reassembled before any demultiplexing processes by arranging the fragments received from the various links. If any fragments are lost, the datagram cannot be reassembled. The terminal may start a reassembly timer when it receives an initial fragment. If the timer expires before all the fragments arrive, the user terminal may discard the surviving pieces without processing the datagram. At a high layer of the TCP protocol, a re-send signal may be sent for the entire datagram.

Figure 7A:
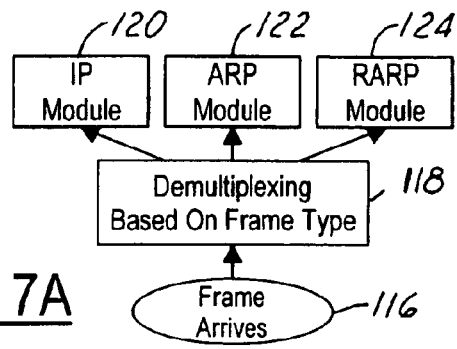
FIGS. 7A, 7B, and 7C are flow diagrammatic views for receiving datagrams according to the present invention.
Figure 7B:
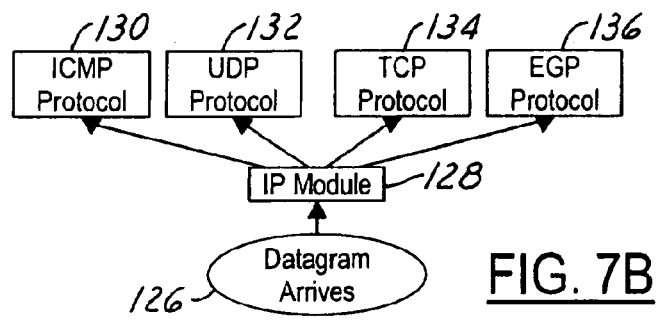
Figure 7C:
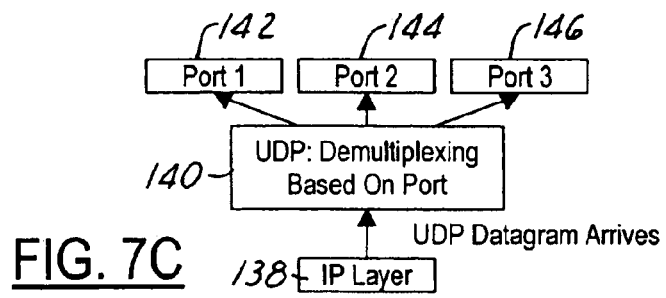

Referring now to FIGS. 7A, 7B, and 7C, three levels of multiplexing are indicated. In FIG. 7A, the first demultiplexing is at incoming frame where frame arrives in block 116. In block 118, the demultiplexing is based upon the frame type. The frame content following the header may be an IP module 120, an address resolution protocol (ARP) module 122, or a reverse address resolution module (RARP) 124. In FIG. 7B, a datagram arrives in block 126, the resident IP software chooses an appropriate receiver to handle the datagram based on the protocol type field in the datagram header in block 128. Datagram may be classified according to various protocols such as Internet control message protocol (ICMP) 130, for router and host to send reports of problems of the datagrams to the originator including echo requests and replies, User Datagram Protocol (UDP protocol) 132 which is connection oriented, TCP protocol 134 which is connection oriented, and exterior gateway protocol (EGP) 136 for a router in one autonomous system, advertise the IP address of the networks in that autonomous system to a router in another autonomous system.

Referring now to FIG. 7C, the third demultiplexing may take place at a level higher than the IP layer 138. In this example, UDP 140 uses a UDP destination port number to select the appropriate destination port for incoming datagrams. A socket uniquely requests an IP plus a port number. As illustrated, three ports 142, 144, and 146 are illustrated connected to UDP 140. Connection between two hosts are specified fully by sockets assigned to each connection end. Connections between two sockets are full dual duplex communication paths between end processes. TCP uses connection, not protocol port as its fundamental abstraction; connections identified by a pair of end points. TCP provides reliable stream service, UDP provides unreliable datagram service; application programs use both.

While the best modes for carrying out the invention have been described in detail, those familiar with the art to which this invention relates will recognize various alternative designs and embodiments for practicing the invention as defined by the following claims.

What is claimed is:

1. A communication system comprising:
   a plurality of high altitude communication devices;
   a user terminal establishing a plurality of multiple dynamic links corresponding respectively to said plurality of high altitude communication devices, said user terminal generating multiple communication portions of a communication and transmitting the multiple communication portions through said multiple dynamic links, wherein said multiple dynamic links comprise a plurality of forward links and a plurality of return links, wherein said plurality of forward user links is greater than said plurality of return links; and
   a gateway terminal receiving the communication portions from the high altitude communication devices and reassembling the communication portions into the communication.

2. A system as recited in claim 1, wherein said high altitude communication device comprises a stratospheric platform.

3. A system as recited in claim 1, wherein said high altitude communication device is selected from the group consisting of a LEO satellite, a MEO satellite, or a GEO satellite.

4. A system as recited in claim 1, wherein said user terminal is mobile.

5. A system as recited in claim 1, wherein said multiple dynamic links are capable of having independently varying data rates.

6. A system as recited in claim 1, wherein said user terminal comprises a router for routing uplink communication portions through said links.

7. A system as recited in claim 1, wherein said router receives the communication portions and arranges the communication portions in a predetermined sequence.

8. A system as recited in claim 1, wherein said user terminal comprises a multiple beam antenna capable of simultaneously generating the multiple dynamic links.

9. A system as recited in claim 1, wherein said user terminal comprises a TCP/IP protocol for transmitting the multiple communication portions.

10. A communication system comprising:

a plurality of high altitude communication devices;

a user terminal establishing a plurality of multiple dynamic links corresponding respectively to said plurality of high altitude communication devices, said user terminal generating multiple communication portions of a communication and transmitting the multiple communication portions through said multiple dynamic links, wherein said user terminal comprises a hub and router circuit coupled to a digital beam former for receiving dynamic links; and a gateway terminal receiving the communication portions from the high altitude communication device and reassembling the communication portions into the communication.

11. A system as recited in claim 10, wherein said high altitude communication device comprises a stratospheric platform.

12. A system as recited in claim 10, wherein said high altitude communication device is selected from the group consisting of a LEO satellite, a MEO satellite, or a GEO satellite.

13. A system as recited in claim 10, wherein said user terminal is mobile.

14. A system as recited in claim 10, wherein said multiple dynamic links are capable of having independently varying data rates.

15. A system as recited in claim 10, wherein said user terminal comprises a router for routing uplink communication portions through said links.

16. A system as recited in claim 10, wherein said router receives the communication portions and arranges the communication portions in a predetermined sequence.

17. A system as recited in claim 10, wherein said user terminal comprises a multiple beam antenna capable of simultaneously generating the multiple dynamic links.

18. A system as recited in claim 10, wherein said user terminal comprises a TCP/IP protocol for transmitting the multiple communication portions.

19. A user terminal for a communication system having a plurality of high altitude communication devices comprises:

a plurality of receiving elements;

a receiving digital beam forming network for forming a plurality of receive beams from the plurality of elements;

a receiving hub and router circuit coupled to the receiving digital beam forming network for assembling communication portions from the beams formed in the receiving beam forming network;

a receiving direction control circuit coupled to the hub and router circuit and the receiving digital beam forming network for estimating relative position vectors for high altitude communication devices and the user terminal, said receiving digital beam forming network directing the receive beams to the high altitude communication devices;

a plurality of transmitting elements coupled to a transmitting digital beam forming network;

a transmitting hub and router circuit coupled to the transmitting digital beam forming network for making a communication into a plurality of datagrams and routing the plurality of datagrams through multiple dynamic links formed by transmitting digital beam forming networks; and a transmitting direction control circuit coupled to said hub and router circuit and to said transmitting digital beam forming network for forming relative position vectors of said user terminal and high altitude device, said transmitting digital beam forming network directing transmitting beams to the plurality of high altitude communication devices.

20. A user terminal as recited in claim 19, wherein said transmitting direction control circuit comprises estimation algorithms for generating a user state vector and a platform state vector.

21. A user terminal as recited in claim 20, wherein said user state vector and said platform state vector are used to generate relative position vectors.

22. A user terminal as recited in claim 19, wherein said transmitting hub and router circuit comprises a routing table which is updated with motion vectors from said transmitting direction control circuit.

23. A user terminal as recited in claim 19, wherein said transmitting digital beam forming circuit comprises a demodulator.

24. A method of operating a communications system comprising:

forming a plurality of multiple communication links directed to a plurality of high altitude communication devices;

dividing a communication into a plurality of datagrams;

routine the plurality of datagrams through the plurality of multiple communication links;

directing the datagrams from the plurality of high altitude communication devices to a gateway station;

reassembling the datagrams into the communication;

generating a second plurality of datagrams at a gateway station;

establishing a second plurality of dynamic communication links between a communication station and a user terminal through the plurality of high altitude communication devices; and reassembling the second plurality of datagrams into the communication at a user terminal.

25. A method as recited in claim 24 prior to the step of reassembling, further comprising classifying the datagrams according to protocol.

26. A method as recited in claim 24 prior to the step of reassembling, starting a reassembly timer counting a time; when the time exceeds a predetermined time before all fragments of a datagram arrive, disregarding the datagram; and, generating a resend signal.

* * * * *